US010035069B1

(12) United States Patent
Chu et al.

(10) Patent No.: US 10,035,069 B1
(45) Date of Patent: *Jul. 31, 2018

(54) INTERFACE-BASED GAME-SPACE CONTEST GENERATION

(71) Applicant: Kabam, Inc., San Francisco, CA (US)

(72) Inventors: Yuexin Chu, San Francisco, CA (US);
Alex Genco, San Francisco, CA (US);
Jason Lee, San Francisco, CA (US);
Clive Henrick, Castro Valley, CA (US);
Matthew Curtis, Novato, CA (US);
Kellen Christopher Smalley, Dublin, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,163

(22) Filed: Oct. 6, 2017

Related U.S. Application Data

(63) Continuation of application No. 14/480,516, filed on Sep. 8, 2014, now Pat. No. 9,782,679, which is a
(Continued)

(51) Int. Cl.
*A63F 13/70* (2014.01)
*A63F 13/798* (2014.01)
(Continued)

(52) U.S. Cl.
CPC ............ *A63F 13/70* (2014.09); *A63F 13/79* (2014.09); *A63F 13/798* (2014.09);
(Continued)

(58) Field of Classification Search
CPC ...... G07F 17/3276; A63F 13/70; A63F 13/79; A63F 13/798; A63F 2300/55; A63F 2300/5546; A63F 2300/558
See application file for complete search history.

(56) References Cited

U.S. PATENT DOCUMENTS 5,816,918 A    10/1998   Kelly
5,933,813 A    8/1999   Teicher
(Continued)

FOREIGN PATENT DOCUMENTS

KR    1020130137431    12/2013
WO    2002026333    1/2002
(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.
(Continued)

*Primary Examiner* — Wiliam H McCulloch, Jr.
(74) *Attorney, Agent, or Firm* — Sheppard Mullin Richter & Hampton LLP

(57) ABSTRACT

An approach to facilitating interface-based game-space contest generation is provided. A user interface may be provided to an administrator. The user interface may be configured to receive user inputs from the administrator that include one or more performance criteria to be associated with a contest to be provided in a game space, one or more awards to be distributed in association with the contest, and one or more qualifications to participate in the contest. A notification that relates to the contest may be provided, based on the user inputs, in the game space. Performance scores of users that participated in the contest may be determined based on the performance criteria and activities that are performed in the game space by the participating users. Automated distribution of the awards to individual ones of the participating users may be facilitated in accordance with the performance scores of the individual participating users.

20 Claims, 4 Drawing Sheets

Related U.S. Application Data continuation of application No. 13/847,981, filed on Mar. 20, 2013, now Pat. No. 8,831,758.

(51) Int. Cl.
  *A63F 13/79*  (2014.01)
  *G07F 17/32*  (2006.01)

(52) U.S. Cl.
  CPC ...... *G07F 17/3276* (2013.01); *A63F 2300/55* (2013.01); *A63F 2300/558* (2013.01); *A63F 2300/5546* (2013.01)

(56) References Cited

U.S. PATENT DOCUMENTS

| | | | |
|---|---|---|---|
| 5,964,660 A | 10/1999 | James | |
| 6,142,472 A | 11/2000 | Kliebisch | |
| 6,190,225 B1 | 2/2001 | Coleman | |
| 6,402,619 B1 | 6/2002 | Sato | |
| 6,561,904 B2 | 5/2003 | Locke | |
| 6,604,008 B2 | 8/2003 | Chudley | |
| 6,745,236 B1 | 6/2004 | Hawkins | |
| 6,811,483 B1 | 11/2004 | Webb | |
| 6,850,900 B1 | 2/2005 | Hare | |
| 6,928,474 B2 | 8/2005 | Venkatesan | |
| 7,050,868 B1 | 5/2006 | Graepel | |
| 7,076,453 B2 | 7/2006 | Jammes | |
| 7,156,733 B2 | 1/2007 | Chiang | |
| 7,192,352 B2 | 3/2007 | Walker | |
| 7,197,352 B2 | 3/2007 | Gott | |
| 7,326,115 B2 | 2/2008 | Baerlocher | |
| 7,381,133 B2 | 6/2008 | Thomas | |
| 7,533,336 B2 | 5/2009 | Jaffe | |
| 7,660,740 B2 | 2/2010 | Boone | |
| 7,682,239 B2 | 3/2010 | Friedman | |
| 7,698,229 B2 | 4/2010 | Hsu | |
| 7,785,188 B2 | 8/2010 | Cannon | |
| 7,813,821 B1 | 10/2010 | Howell | |
| 7,819,749 B1 | 10/2010 | Fish | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,066,571 B2 | 11/2011 | Koster | |
| 8,105,156 B2 | 1/2012 | Walker | |
| 8,147,340 B2 | 4/2012 | BrunetdeCourssou | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 | 8/2012 | Hoffman | |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 | 9/2012 | Kelly | |
| 8,282,491 B2 | 10/2012 | Auterio | |
| 8,287,367 B2 | 10/2012 | Hall | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,584 B2 | 11/2012 | Aoki | |
| 8,317,601 B1 | 11/2012 | Luciano, Jr. | |
| 8,323,110 B2 | 12/2012 | Shibamiya | |
| 8,328,642 B2 | 12/2012 | Mosites | |
| 8,332,260 B1 | 12/2012 | Mysen | |
| 8,332,544 B2 | 12/2012 | Rails | |
| 8,348,716 B2 | 1/2013 | Ganz | |
| 8,348,762 B2 | 1/2013 | Willis | |
| 8,348,767 B2 | 1/2013 | Mahajan | |
| 8,348,768 B2 | 1/2013 | Auterio | |
| 8,360,858 B2 | 1/2013 | Larocca | |
| 8,360,866 B2 | 1/2013 | VanLuchene | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann | |
| 8,371,925 B2 | 2/2013 | Bonney | |
| 8,376,826 B2 | 2/2013 | Katz | |
| 8,382,572 B2 | 2/2013 | Hoffman | |
| 8,388,427 B2 | 3/2013 | Yariv | |
| 8,401,913 B2 | 3/2013 | Alivandi | |
| 8,408,989 B2 | 4/2013 | Bennett | |
| 8,439,759 B1 | 5/2013 | Mello | |
| 8,475,262 B2 | 7/2013 | Wolf | |
| 8,506,394 B2 | 8/2013 | Kelly | |
| 8,512,150 B2 | 8/2013 | Herrmann | |
| 8,533,076 B2 | 9/2013 | Chu | |
| 8,583,266 B2 | 11/2013 | Herbrich | |
| 8,636,591 B1 | 1/2014 | Hawk | |
| 8,758,119 B1 | 6/2014 | BronsteinBendayan | |
| 8,777,754 B1 | 7/2014 | Santini | |
| 8,784,214 B2 | 7/2014 | Parks | |
| 8,790,185 B1 | 7/2014 | Caldarone | |
| 8,821,260 B1 | 9/2014 | DesSanti | |
| 8,831,758 B1 | 9/2014 | Chu | |
| 8,843,557 B2 | 9/2014 | Ranade | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,007,189 B1 | 4/2015 | Curtis | |
| 9,138,639 B1 | 9/2015 | Ernst | |
| 9,256,887 B2 | 2/2016 | Santini | |
| 9,257,007 B2 | 2/2016 | Santini | |
| 9,259,642 B1 | 2/2016 | McNeill | |
| 9,286,510 B2 | 3/2016 | Soohoo | |
| 9,317,993 B2 | 4/2016 | Hardy | |
| 9,375,636 B1 | 6/2016 | Wakeford | |
| 9,403,093 B2 | 8/2016 | Harrington | |
| 9,406,201 B2 | 8/2016 | Englman | |
| 9,452,356 B1 | 9/2016 | Tsao | |
| 9,452,364 B1 | 9/2016 | Curtis | |
| 9,463,376 B1 | 10/2016 | Kim | |
| 9,468,851 B1 | 10/2016 | Pieron | |
| 9,610,503 B2 | 4/2017 | Pieron | |
| 9,626,475 B1 | 4/2017 | Schultz | |
| 9,656,174 B1 | 5/2017 | McLellan | |
| 9,669,313 B2 | 6/2017 | Pieron | |
| 9,682,314 B2 | 6/2017 | Kim | |
| 9,782,679 B1 * | 10/2017 | Chu | A63F 13/70 |
| 9,789,407 B1 | 10/2017 | Pieron | |
| 2002/0023039 A1 | 2/2002 | Fritsch | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0174178 A1 | 9/2003 | Hodges | |
| 2003/0190960 A1 | 10/2003 | Jokipii | |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0143852 A1 | 7/2004 | Meyers | |
| 2004/0199471 A1 | 10/2004 | Hardjono | |
| 2004/0215524 A1 | 10/2004 | Parkyn | |
| 2004/0224745 A1 | 11/2004 | Bregenzer | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |

(56) References Cited

U.S. PATENT DOCUMENTS

| | | |
|---|---|---|
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0058103 A1 | 3/2006 | Danieli |
| 2006/0063587 A1 | 3/2006 | Manzo |
| 2006/0100006 A1 | 5/2006 | Mitchell |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0105615 A1 | 5/2007 | Lind |
| 2007/0111770 A1 | 5/2007 | Van Luchene |
| 2007/0129139 A1 | 6/2007 | Nguyen |
| 2007/0129147 A1 | 6/2007 | Gagner |
| 2007/0155485 A1 | 7/2007 | Cuddy |
| 2007/0191101 A1 | 8/2007 | Coliz |
| 2007/0191102 A1 | 8/2007 | Coliz |
| 2007/0213116 A1 | 9/2007 | Crawford |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0120525 A1 | 5/2010 | Baerlocher |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman |
| 2011/0227919 A1 | 9/2011 | Bongio |
| 2011/0250954 A1 | 10/2011 | Braund |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |

(56) References Cited

U.S. PATENT DOCUMENTS

| | | |
|---|---|---|
| 2012/0311504 A1 | 12/2012 | van Os |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1 | 10/2013 | Carpe |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"A Wondrous Drop Event and Double Exp", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_ Drop_Event_and_Double_EXP>. 2 pages.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encyclopedia. [on line], [retrieved on Jan. 12, 2016]. Retrieved from the Internet<URL:https://en.wikipedia.org/w/index.php?title=Flyff&oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro Store" written by Elinnea, published on Dec. 15, 2011 and printed from URL <http://lotrowiki.com/index.php ?title=LOTRO _Store&oldid=396550>, 23 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_

(56) References Cited

OTHER PUBLICATIONS

Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.
"Lotro-Wiki.com" (evidence in regards to "Lord of the Rings Oline" MMORPG game), latest Dec. 1, 22, 2011, <http://lotrowiki.com/index.php/Main_Page), http://lotro-wiki.com/index.php?title=LOTRO_Store&oldid=396550, http:/lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.
"Main Page" written by Starbusty, published on Dec. 12, 2011 and printed from URL <http://lotrowiki.com/index.php?title=Main_Page&oldid=394429>, 2 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_1&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part 2&oldid=399366>, 2 pages.
"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
<http://lotro-wiki.com/index.php?title=Ouest:A_Little_Extra_Never_Hurts_--  Part 2&oldid=399366>, <http://lotrowiki.com/index.php ?title=Getting_Started&oldid=349681 >. Links are to used articles. (7 pgs) Feb. 26, 2014.
City Coins. CityVille Wikia. Online. Accessed via the Internet. Accessed Aug. 9, 2014. <URL: http://cityville.wikia.com/wiki/City_Coins>, 2 pages.
Elsword—Wikipedia, the free encyclopedia, URL: en.wikipedia.org/wiki/Elsword [Retrieved Feb. 21, 2013], 6 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MMO Site "Rose Online Launches the Newest in Game Feature"; available Aug. 11, 2011 from https://web.archive.org/web/20110811231226/http://news.mmosite.com/ content/2011-06-21/rose_online_launches_the_newest_in_game_feature.1.shtml, 3 pages.
New Feature: Tiered Tournaments and Tournament Updates, printed from http://community.kabam.com/forums/showthread.php?171349-New-Feat on Feb. 11, 2014, 2 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
PCT International Search Report and Written Opinion for PCT/US2016/017637 dated Apr. 7, 2016, 12 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 8 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/game-play/systems/00Flk/, http://maplestory.nexon.net/guides/game-play/systems/00Flk,http://maplestory.nexon.net/guides/game-play/systems/00FFV, Sep. 28, 2012, 12 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFlj; [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
Super Mario Bros. 3, NES Gameplay, http://www.youtube.com/watch?v=82TL-Acm4ts, Published on Mar. 14, 2009, 1 page.
Super Mario Bros. 3, StrategyWiki, the video game walkthrough and strategy guide, http://strategywiki.org/wiki/Super_Mario_Bros._3, Oct. 2, 2012, 4 pages.
Super Mario Bros. 3 Review, Nintendo for NES, Feb. 1990, pp. 1-4.

(56) References Cited

OTHER PUBLICATIONS

TFF Challenge—UC Davis, http://tffchallenge.com/team/uc-davis/, printed Jan. 15, 2014, 12 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.

\* cited by examiner

US 10,035,069 B1

INTERFACE-BASED GAME-SPACE CONTEST GENERATION

CROSS-REFERENCE TO RELATED APPLICATIONS

This application is a continuation of U.S. patent application Ser. No. 14/480,516, filed Sep. 8, 2014, which is a continuation of U.S. patent application Ser. No. 13/847,981 (U.S. Pat. No. 8,831,758), filed May 20, 2013, both of which are incorporated herein by reference in their entireties.

FIELD OF THE DISCLOSURE

This disclosure relates generally to interface-based game-space contest generation.

BACKGROUND

Traditionally, configuration of a contest is performed by engineers to manually code changes to the backend to execute the contest. Typically, at the end of a contest, administrators manually judge the performance of participating users of the contest, for instance, by evaluating contest activities performed by those users, by comparing scores computed for those users, etc. In addition, the administrators often manually distribute the contest awards based on their judging. Among other issues, these conventional techniques may be associated with human-related errors (e.g., judging errors, awarding errors, etc.) along with delays in award distribution, resulting in user dissatisfaction with the contest experience, higher volume of support calls, and/or other drawbacks.

SUMMARY

One aspect of the disclosure relates to a system configured to facilitate interface-based game-space contest generation, in accordance with one or more implementations. In exemplary implementations, one or more performance criteria to be associated with a contest to be provided in a game space, one or more awards to be distributed in association with the contest, one or more qualifications to participate in the contest, and/or other contest-related user inputs may be received via a user interface. Based on these user inputs, a notification that relates to the contest may be provided in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), improve user experience relating to such contests, lower the number of support calls, and/or provide other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate interface-based game-space contest generation. The computer program modules may include one or more of a template interface module, a contest implementation module, a performance determination module, an award distribution module, and/or other modules. In some implementations, the client computing platforms may be configured to execute one or more computer program modules that are the same as or similar to the computer program modules of the server(s) to facilitate interface-based game-space contest generation.

The template interface module may be configured to provide a user interface configured to receive user inputs that include one or more performance criteria to be associated with a contest to be provided in a game space, one or more awards to be distributed in association with the contest, one or more qualifications to participate in the contest, and/or other user inputs. The template interface module may be configured to provide the user interface to an administrator to receive the user inputs from the administrator via the user interface. The game space may be configured to facilitate interaction of users with the game space and/or each other by performing operations in the game space in response to commands received from the users.

In certain implementations, the performance criteria may relate to success with respect to the contest to be provided in the game space. The success-related performance criteria may relate to one or more of resource collection, building possession, combat, rescues, or level progress.

In some implementations, the qualifications to participate in the contest may include merit-based qualifications associated with the game space. The merit-based qualifications may relate to one or more of possessed structures, collected resources, combat history, rescue history, or user level.

The contest implementation module may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications.

In certain implementations, the contest implementation module may execute the contest in the game space based on the user inputs. The performance determination module may be configured to determine, based on the performance criteria and activities that are performed in the game space by the users that participated in the contest, performance scores of the participating users. The award distribution module may be configured to facilitate automated distribution of the awards to individual ones of the participating users in accordance with the performance scores of the individual participating users.

In various implementations, the award distribution module may be configured such that at least one of the awards is distributed to at least one of the participating users in response to the performance scores of the at least one participating user satisfying one or more performance thresholds.

In certain implementations, the award distribution module may be configured such that the awards are distributed based on one or more predetermined intervals of the contest. In some implementations, the award distribution module may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In certain implementations, the template interface module may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
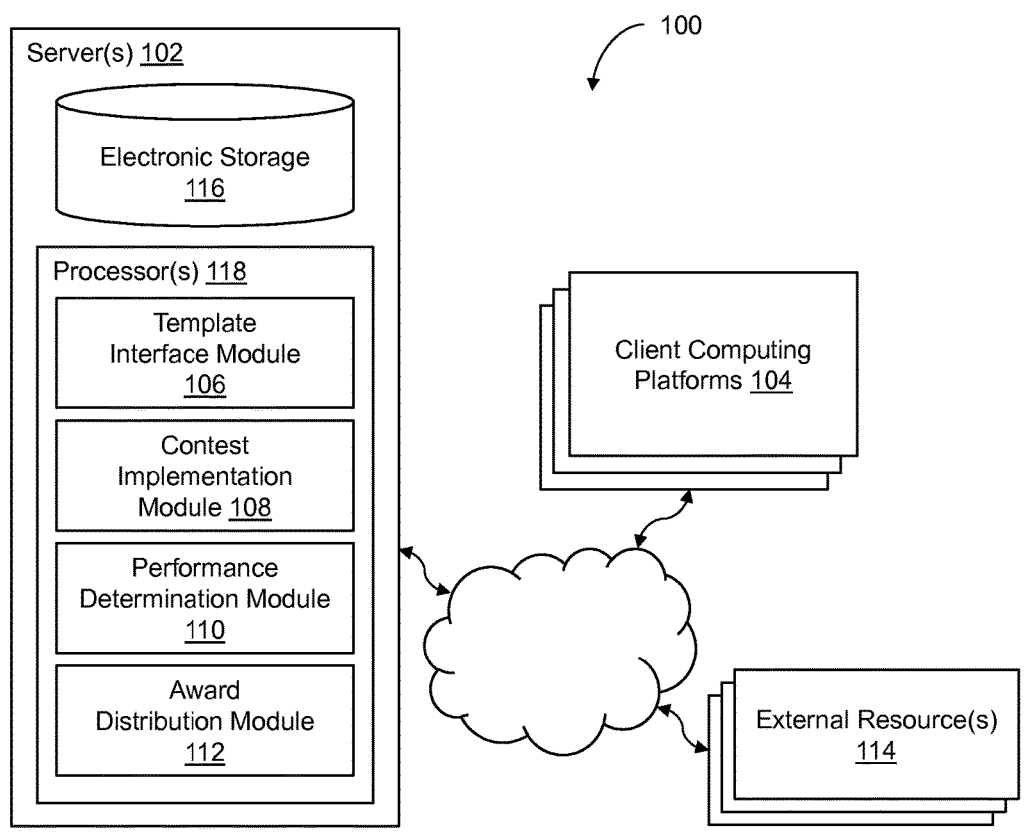
FIG. 1 illustrates a system configured to facilitate interface-based game-space contest generation, in accordance with one or more implementations.

FIG. 1 illustrates a system 100 configured to facilitate interface-based game-space contest generation, in accordance with one or more implementations. In exemplary implementations, user inputs that relate to a contest to be provided in a game space may be received via a user interface. The user inputs may include one or more performance criteria to be associated with the contest, one or more awards to be distributed in association with the contest, one or more qualifications to participate in the contest, and/or other contest-related user inputs. A notification that relates to the contest may be provided, based on the user inputs, in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate interface-based game-space contest generation. The computer program modules may include one or more of a template interface module 106, a contest implementation module 108, a performance determination module 110, an award distribution module 112, and/or other modules. In some implementations, client computing platforms 104 may be configured to execute one or more computer program modules that are the same as or similar to the computer program modules of server(s) 102 to facilitate interface-based game-space contest generation.

Template interface module 106 may be configured to provide a user interface configured to receive user inputs that include one or more performance criteria to be associated with a contest to be provided in a game space, one or more awards to be distributed in association with the contest, one or more qualifications to participate in the contest, and/or other user inputs. Template interface module 106 may be configured to provide the user interface to an administrator to receive the user inputs from the administrator via the user interface.

Figure 2:
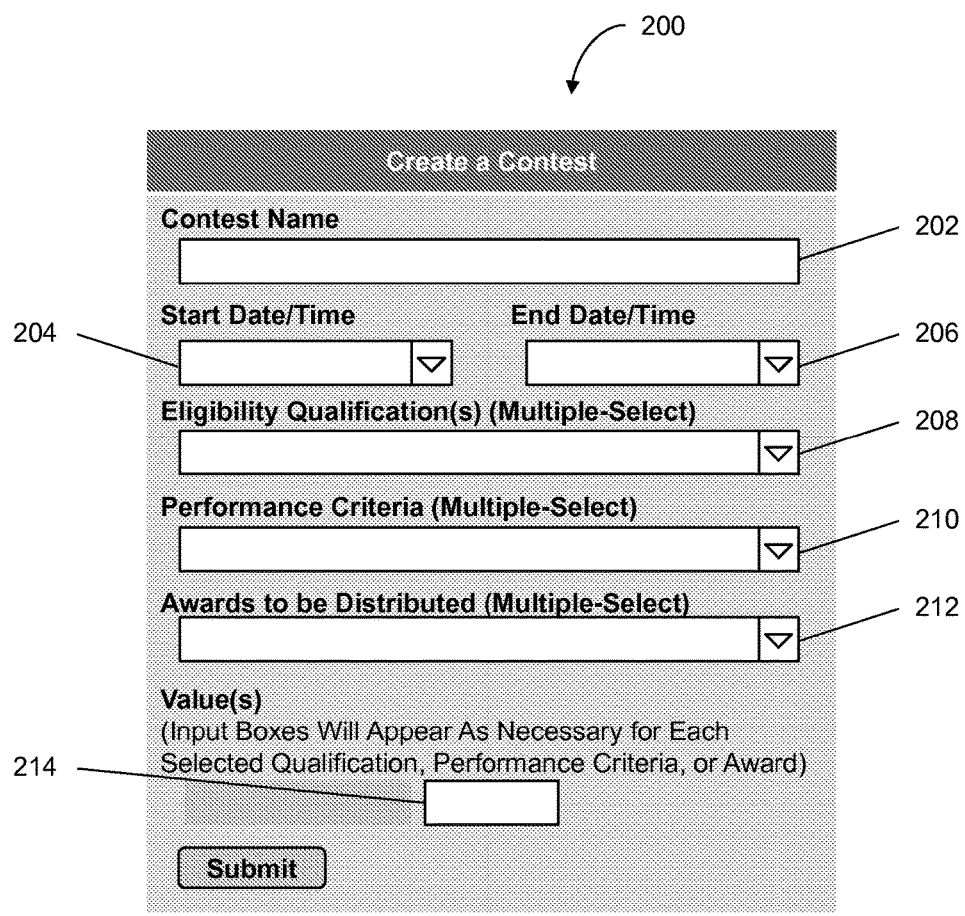
FIG. 2 illustrates a diagram of a user interface for receiving user inputs relating to a contest, in accordance with one or more implementations.

Along these lines, FIG. 2 illustrates a diagram of a user interface 200 for receiving user inputs relating to a contest, in accordance with one or more implementations. As shown, user interface 200 enables an administrator to create a contest by entering a contest name, start/end dates and times, eligibility qualifications to be a participating user, performance criteria that can be used to assess success with respect to the contest, awards to be distribution in association with the contest, values that may be associated with selected qualifications, performance criteria, or awards, and/or other contest-related user inputs. These user inputs may, for instance, be provided by the administrator via input fields 202, 204, 206, 208, 210, 212, and 214. In one use case, the administrator may select multiple performance criteria from the drop-drop menu of input field 210. One or more corresponding input fields 214 may appear in response to the multiple selections to enable the administrator to enter, if necessary, values associated with one or more of the multiple selections (e.g., to indicate an contest activity that a performance criteria is associated with, to indicate a threshold for the performance criteria, etc.). Upon entering the user inputs, the administrator may activate the "Submit" button to initiate creation of the contest, to be provided with further options (e.g., selecting activities for the contest, saving of the contest as a template that includes the user inputs, etc.). As used herein, an administrator may include a user that has access rights to create, modify, activate, deactivate, or remove contests.

As such, in certain implementations, the performance criteria may relate to success with respect to the contest to be provided in the game space. The success-related performance criteria may relate to one or more of resource collection, building possession, combat (e.g., between user characters and/or non-user characters), rescues (e.g., of user characters and/or non-user characters), level progress, and/ or other game-space features. For example, with respect to FIG. 2, the performance criteria that can be selected via input field 210 may include criteria to assess whether a participating user will be distributed a contest award (e.g., when assessed individually, when compared with other participating users, etc.). These criteria may, for instance, relate to an amount of, specific types, or particular ones of: (1) resources that the participating user may be required to collect; (2) buildings that the participating user needs to conquer or possess; (3) combats or rescues that the participating user needs to attempt, win, or complete; and/or (4) progress with respect to levels that the participating user needs to achieve (e.g., user level, building level, research level, etc.). As another example, other such criteria may relate to an amount of, specific types, or particular ones of: (1) sales that the participating user needs to make; (2) purchases that the participating user needs to make; (3) items that the participating user needs to collect or use; (4) currency that the participating user needs to purchase or spend; (5) length of gameplay that the participating user needs to achieve; (6) characters with which the participating user needs to interact; (7) alliances that the participating user needs to join; (8) logins that the participating user needs to initiate; or (8) other objectives to achieve.

In some implementations, the qualifications to participate in the contest may include merit-based qualifications associated with the game space. The merit-based qualifications may relate to one or more of possessed structures, collected resources, combat history, rescue history, user level, and/or other game-space features. For example, with respect to FIG. 2, the qualifications that can be selected via input field 208 may include qualifications relating to user achievements in the game space. A user may, for instance, be qualified to participate in a contest by achieving certain goals before a qualification deadline, such as: (1) collecting an amount of, a specific type of, or a particular resource(s); (2) conquering or possessing an amount of, a specific type of, or a particular building(s); (3) winning or completing an amount of, a specific type of, or a particular combat(s) or rescue(s); and/or (4) reaching a certain level in the game space (e.g., user level, building level, research level, etc.). As another example, other qualifications may relate to an amount of, specific types, or particular ones of: (1) sales that a user needs to make; (2) purchases that the user needs to make; (3) items that the user needs to collect or use; (4) length of gameplay of the user; (5) characters with which the user needs to interact; (6) currency that the user needs to purchase or spend; (6) alliances that the user needs to join; (7) logins that the user needs to initiate; or (8) other achievements.

In various implementations, the qualifications to participate in the contest may include non-merit-based qualifications. The non-merit-based qualifications may include contest participation fees, user age requirements, server requirements (e.g., a contest may be limited to users with accounts hosted on particular servers), location requirements (e.g., the contest may be limited to users with characters in particular areas of the game space, users located in particular areas of the real world, etc.), or other non-merit-based qualifications.

In some implementations, the game space may be a virtual space. An instance of the game space may be an instance of the virtual space. A space module may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from the space module. Expressions of the instance executed on the clients may include space logic that effectively provides for execution of a limited version of the instance on a client that is synchronized and/or verified with state information received from the space module. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by the space module is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through a space module).

Contest implementation module 108 may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications. In this way, users of the game space may be informed of the contest, be incentivized to participate in the contest (e.g., in response to the notification of the awards), become more engaged in the game space (e.g., to become qualified to participate in the contest before a qualification deadline), and/or provide other benefits.

Figure 3:
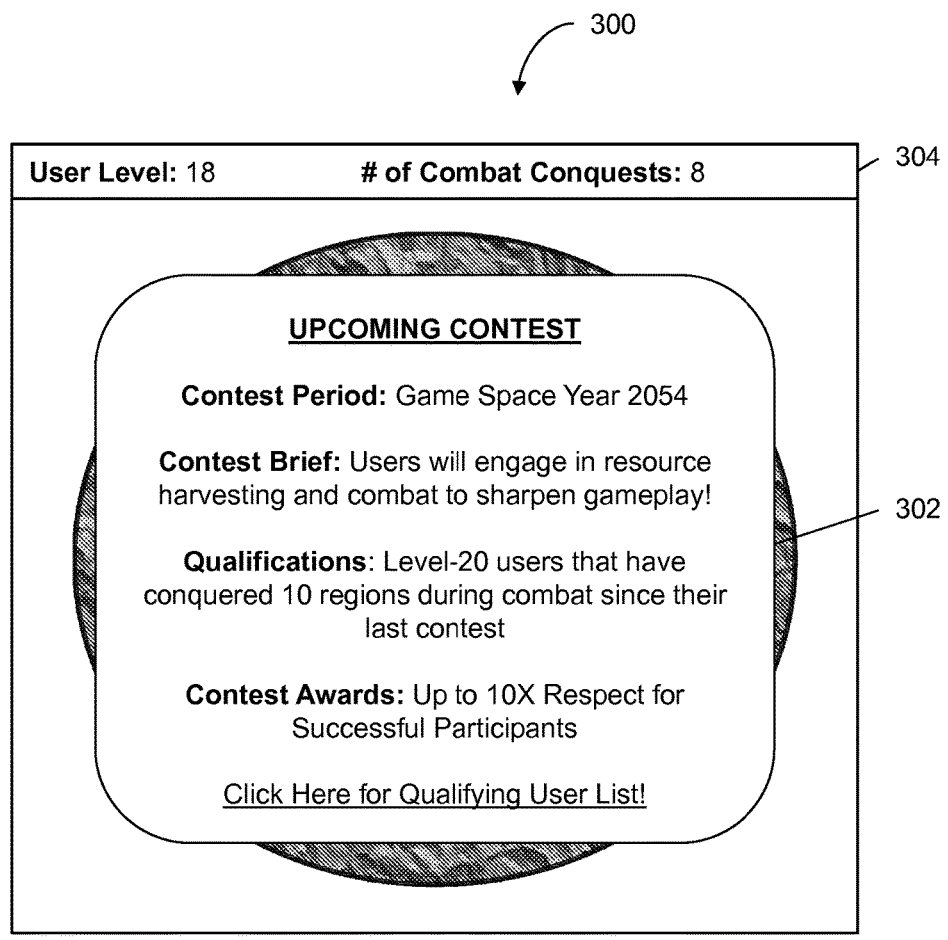
FIG. 3 illustrates a diagram of a user interface depicting a notification relating to a contest, in accordance with one or more implementations.

By way of example, FIG. 3 illustrates a diagram of a user interface 300 depicting a notification 302 relating to a contest, in accordance with one or more implementations. As shown, user interface 300 includes a status bar 304 to indicate a user's level, a number of combat conquests since a previous contest, and/or other information to the user. User interface 300 may utilized to present notification 302 to inform the user of the contest period, a brief summary of the contest, qualifications to be eligible to participate in the contest, contest awards to be distributed in association with the contest, and a link to a list of qualifying users that may participate in the contest. Notification 302 may be generated based on the user inputs entered by an administrator via input fields 202, 204, 206, 208, 210, 212, and 214 of user interface 200 that is shown in FIG. 2. In one use case, the link to the list of qualifying users in notification 302 may be generated based on the qualifications selected by the administrator via input field 208 and the associated values entered in input fields 214. In another use case, notification 302 may specify the qualifying users in lieu of the link to the list, inform the user whether he/she is one of the qualifying users, and/or provide other information relating to the qualifications.

In certain implementations, contest implementation module 108 may execute the contest in the game space based on the user inputs. In one scenario, content implementation module 108 may set the contest period to be from the user-inputted start date/time until the user-inputted end date/time. As an example, activities of the contest may be made available to the participating users during the contest period. As another example, activities of the contest may be activities that can be performed by users (without regard to the contest) in the game space but those activities may be monitored for the participating users in association with the contest during the contest period to determine performance scores of the participating users that perform the activities. Contest-related activities may include collecting resources, constructing or otherwise obtaining buildings, engaging in combat, performing rescues, selling merchandise, collecting items, and/or other activities. In another scenario, user-inputted awards may be distributed to the participating users throughout the duration of the contest period, at the end of the contest period, or at other times in accordance with the determined performance scores of the participating users.

As such, performance determination module 110 may be configured to determine, based on the performance criteria and activities that are performed in the game space by the users that participated in the contest, performance scores of the participating users. Award distribution module 112 may be configured to facilitate automated distribution of the awards to individual ones of the participating users in accordance with the performance scores of the individual participating users. For example, in one use case, the activity may be collecting a specific type of resource (e.g., diamond, gold, silver, platinum, iron, wheat, etc.) and the performance criteria may include having the most amounts of the specific type of resource collected during the contest period. As such, participating users that have collected more of the specific type of the resource than other participating users during the contest period may be assigned higher performance score than those other participating users. Thus, awards may be automatically distributed to a certain number of the participating users that collect the most amounts of the specific type of resource during the contest period (e.g., at the end of the contest period, at one or more intervals during the contest period, etc.). The awards may include virtual items, virtual currency, buildings, resources, access to other contests, access to regions in the game space, access to activities in the game space, respect, multipliers (e.g., 10× respect), level increase, and/or other awards.

In various implementations, award distribution module 112 may be configured such that at least one of the awards is distributed to at least one of the participating users in response to the performance scores of the at least one participating user satisfying one or more performance thresholds. By way of example, a particular contest in the game space may provide awards to participating users that satisfy a certain performance threshold. In one use case, the particular contest may be configured such that a participating user may be provided with an award associated with the contest if the participating user harvests a specific predetermined amount of resources during the contest period (e.g., harvesting 5000 units of wood, harvesting 2000 units of wheat, etc.). The participating user may, for instance, be provided with the award during or after the contest period in response to determining that the participating user satisfied the specific resource harvesting threshold during the contest period.

In another use case, the participating user may be provided with multiple awards for satisfying multiple performance thresholds. For example, the participating user may be provided with one award after the participating user harvests a first amount of resources (e.g., 5000 units of wood) during the contest period, and a different award after the participating user harvests a second amount of resources (e.g., 12,000 units of wood). In this way, users may be provided with a plurality of incentives to sign up, participate, and/or continue to participate in the game-space contest. The awards may, for instance, be automatically distributed to the participating user in real-time as soon as the participating user completes each set of activities to satisfy the performance thresholds. As such, wait time associated with distribution of the awards may be eliminated or otherwise reduced.

In certain implementations, award distribution module 112 may be configured such that the awards are distributed based on one or more predetermined intervals of the contest. By way of example, a particular contest may last for a period of one week, each day of the contest may represent one time interval of the contest, and award distribution module 112 may be configured to distribute the awards at the end of each day to individual participating users that are determined to have satisfied one or more performance thresholds.

In some implementations, award distribution module 112 may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In one scenario, a particular contest in the game space may last for a period of one week, and each day of the contest may represent one time interval of the contest. The contest may provide awards to participating users for each day that the participating users perform activities that satisfy a performance threshold. For example, a participating user may be provided with 1000 units of wood when the participating user logs into the game space on the first day of the contest (e.g., logging into the game space may be a predefined activity for satisfying a performance threshold). The participating user may be provided with 1500 units of iron when the participating user logs into the game space on the second day of the contest. The participating user may be provided with 2000 units of wheat when the participating user logs into the game space on the third day of the contest, and so on. In this way, among other benefits, contests may enable participating users to develop habits based on the predefined activities (e.g., logging in on a regular basis), encourage a steady stream of activities by participating users, etc.

In various implementations, template interface module 106 may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template. In one scenario, a game-space contest created via interface-based game-space contest generation that attracted a substantial number of participating users may be reinitiated so that the contest may be repeated in accordance with a predetermined schedule or via a manual user activation of the contest by using the template to provide the user inputs for the contest.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
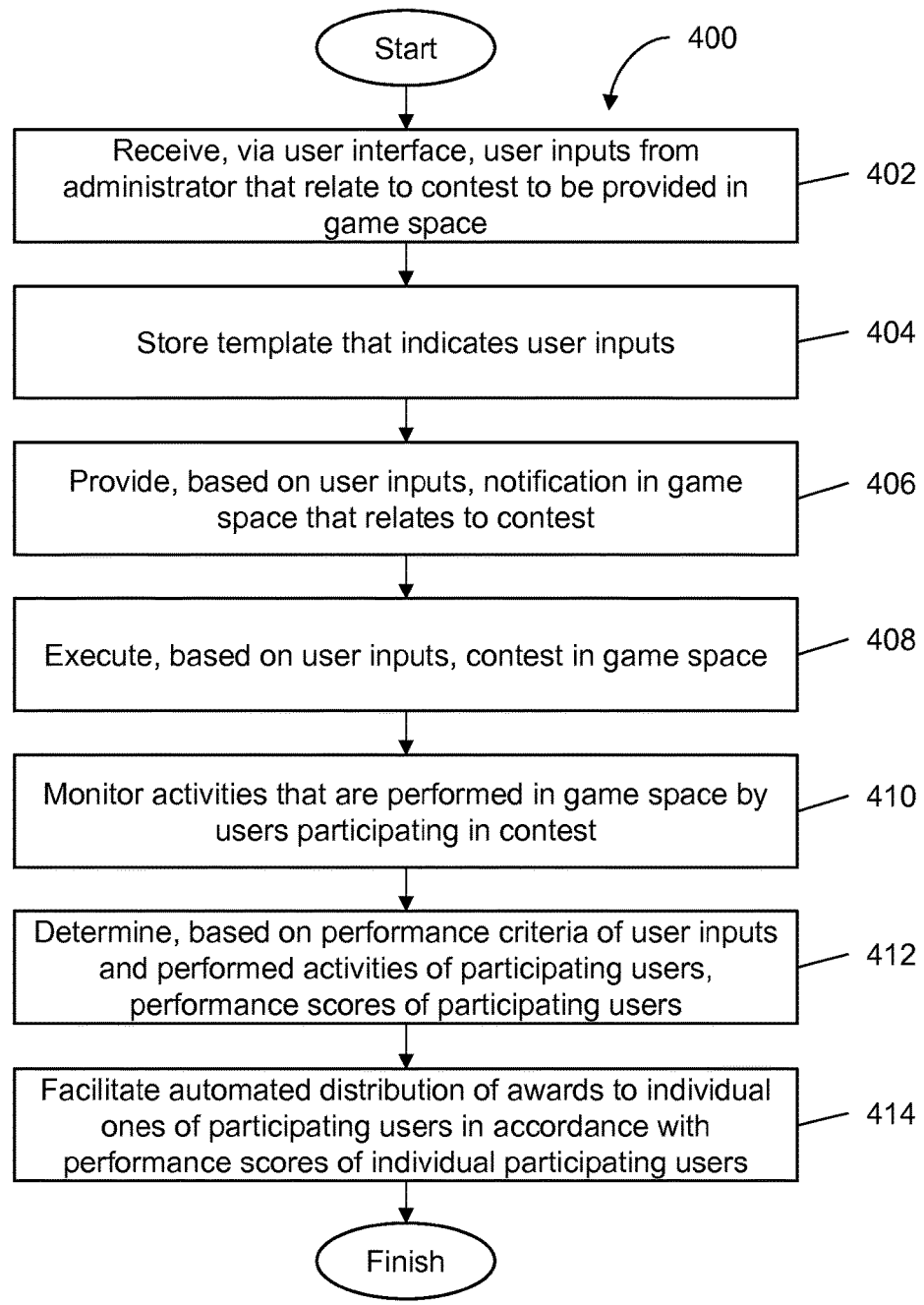
FIG. 4 illustrates a method for facilitating interface-based game-space contest generation, in accordance with one or more implementations.

FIG. 4 illustrates a method for facilitating interface-based game-space contest generation, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, user inputs that relate to a contest to be provided in a game space may be received from an administrator via a user interface. The user inputs may include one or more performance criteria to be associated with the contest, one or more awards to be distributed in association with the contest, one or more qualifications to participate in the contest, and/or other user inputs. The game space may be configured to facilitate interaction of users with the game space and/or each other by performing operations in the game space in response to commands received from the users. In certain implementations, the performance criteria may relate to success with respect to the contest. The success-related performance criteria may relate to one or more of resource collection, building possession, combat, rescues, or level progress. In some implementations, the qualifications include merit-based qualifications associated with the game space. The merit-based qualifications may relate to one or more of possessed structures, collected resources, combat history, rescue history, or user level. Operation 402 may be performed by a template interface module that is the same as or similar to template interface module 106, in accordance with one or more implementations.

At an operation 404, a template that indicates the user inputs may be stored. As such, in some implementations, the contest may be executed in the game space based on the stored template. The contest may, for instance, be executed based on a predetermined schedule, a periodic basis, a manual user activation, and/or other trigger using the user inputs indicated in the stored template. Operation 404 may be performed by a template interface module that is the same as or similar to template interface module 106, in accordance with one or more implementations.

At an operation 406, a notification that relates to the contest may be provided in the game space based on the user inputs. For example, the notification may be provided based on the performance criteria, the awards, and/or the qualifications that are received as user inputs from the administrator via the user interface. In some implementations, the notification may indicate one or more of the users that are qualified to enter the contest. Operation 406 may be performed by a contest implementation module that is the same as or similar to contest implementation module 108, in accordance with one or more implementations.

At an operation 408, the contest may be executed in the game space based on the user inputs. For example, the contest may be executed based on the performance criteria, the awards, and/or the qualifications that are received as user inputs from the administrator via the user interface. Operation 408 may be performed by a contest implementation module that is the same as or similar to contest implementation module 108, in accordance with one or more implementations.

At an operation 410, activities that are performed in the game space by the users participating in the contest may be monitored. Operation 410 may be performed by a performance determination module that is the same as or similar to performance determination module 110, in accordance with one or more implementations.

At an operation 412, performance scores of the participating users may be determined based on the performance criteria and the performed activities of the participating users. Operation 412 may be performed by a performance determination module that is the same as or similar to performance determination module 110, in accordance with one or more implementations.

At an operation 414, automated distribution of the awards to individual ones of the participating users may be facilitated in accordance with the performance scores of the individual participating users. Operation 414 may be performed by an award distribution module that is the same as or similar to award distribution module 112, in accordance with one or more implementations.

In certain implementations, with respect to operation 414, the automated distribution may be facilitated such that the awards are distributed to the individual participating users based on one or more predetermined intervals of the contest. In some implementations, the automated distribution may be facilitated such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed:

1. A system for facilitating generation and execution of contests for an online game, wherein the generation includes providing an administrator user interface to an administrator of the contests, and wherein the online game is configured to facilitate interaction of players with the online game and/or each other in response to commands received from client computing platforms associated with the players, the system comprising:
   one or more processors configured by machine-readable instructions to:
      provide the administrator user interface for presentation to the administrator, wherein the administrator user interface is configured to receive user inputs from the administrator that indicate:
         (i) one or more performance criteria to be associated with activities performed by the players in the online game, and
         (ii) one or more awards to be distributed to the players in association with the one or more contests, wherein the one or more awards include virtual items usable in the online game, and
      wherein the players participate in ongoing gameplay within the online game such that the players that participate in the one or more contests continue to participate in the ongoing gameplay during the one or more contests;
      responsive to receipt of input from the administrator to initiate the one or more contests, provide a notification in the online game that invites participation to the one or more contests, wherein the notification is provided to one or more players;
      determine, based on the performance criteria by the players that participated in the one or more contests, performance scores of the participating players, wherein the activities associated with the one or more performance criteria can be performed by the players in the online game without regard to their participation in the one or more contests such that the activities are performed during the one or more contests by both the players that participated in the one or more contests and by one or more players that did not participate in the one or more contests,
         wherein determining the performance scores of the participating players includes monitoring the activities associated with the one or more performance criteria during the one or more contests by the players that participated in the one or more contests, and
         wherein the activities associated with the one or more performance criteria that contribute to the determination of the performance scores of the participating players in the one or more contests are the same activities performed by the players to achieve one or more game objectives of the ongoing gameplay outside of the one or more contests, wherein the activities include one or more of resource collection, building possession, rescues, or level progress such that an individual player's resource collection, building possession, recues, or level progress while the individual player is participating in the one or more contests also impacts the individual player's achievement of the one or more game objectives of the ongoing gameplay within the online game; and
      automatically distribute the awards to individual ones of the participating players in accordance with the performance scores of the individual participating players.

2. The system of claim 1, wherein the online game is further configured to facilitate interaction of the players with the online game and/or each other by performing operations in the online game to achieve the one or more game objectives.

3. The system of claim 1, wherein the performance criteria relate to success with respect to the one or more contests.

4. The system of claim 1, wherein the administrator user interface is further configured to receive user input that indicates one or more qualifications for individual players to participate in the one or more contests, wherein the one or more qualifications include merit-based qualifications associated with the online game earned separately from the one or more contests and prior to a contest period that defines one or more durations of availability of the one or more contests, wherein the one or more durations correspond to the one or more contests, and wherein provision of the notification is limited to the players that meet the one or more qualifications.

5. The system of claim 4, wherein the merit-based qualifications relate to one or more of possessed buildings, collected resources, combat history, rescue history, or levels associated with the online game.

6. The system of claim 4, wherein the one or more processors are configured by machine-readable instructions such that the notification indicates one or more of the players that are qualified to participate in the one or more contests based on the one or more qualifications.

7. The system of claim 1, wherein the one or more processors are configured by machine-readable instructions to automatically and repeatedly initiate additional contests by providing notifications to the players, determining the performance scores, and distributing the awards, wherein initiation of the additional contests is in accordance with one or both of a predetermined schedule and a trigger as indicated by user input received from the administrator.

8. The system of claim 1, wherein the one or more processors are configured by machine-readable instructions such that at least one of the awards is distributed to at least one of the participating players in response to the performance scores of the at least one of the participating players satisfying one or more performance thresholds.

9. The system of claim 1, wherein the user inputs received from the administrator further indicate one or more predetermined intervals of the one or more contests, wherein the one or more processors are configured by machine-readable instructions such that the awards are distributed to the individual participating players based on the one or more predetermined intervals of the one or more contests.

10. The system of claim 9, wherein the one or more processors are configured by machine-readable instructions such that a first award of the awards is distributed during a first predetermined interval of the predetermined intervals to a first participating player of the participating players in response to the performance scores of the first participating player satisfying a first performance threshold during the first predetermined interval, and such that a second award of the awards is distributed during a second predetermined interval of the predetermined intervals to the first participating player in response to the performance scores of the first participating player satisfying a second performance threshold during the second predetermined interval.

11. A computer-implemented method of facilitating generation and execution of contests for an online game, wherein the generation includes providing an administrator user interface to an administrator of the contests, and wherein the online game facilitates interaction of players with the online game and/or each other in response to commands received from the players, the method being implemented on a computer system that includes one or more physical processors, the method comprising:
   providing the administrator user interface for presentation to the administrator, wherein the administrator user interface receives user inputs from the administrator that indicate:
      (i) one or more performance criteria to be associated with activities performed by the players in the online game,
      (ii) one or more awards to be distributed to the players in association with the one or more contests, wherein the one or more awards include virtual items usable in the online game, and
   wherein the players participate in ongoing gameplay within the online game such that the players that participate in the one or more contests continue to participate in the ongoing gameplay during the one or more contests;
   responsive to receipt of user input from the administrator to initiate the one or more contests, providing a notification in the online game that invites participation to the one or more contests, wherein the notification is provided to one or more players;
   determining, based on the performance criteria by the players that participated in the one or more contests, performance scores of the participating players,
      wherein the activities associated with the one or more performance criteria can be performed by the players in the online game without regard to their participation in the one or more contests such that the activities are performed during the one or more contests by both the players that participated in the one or more contests and by one or more players that did not participate in the one or more contests,
      wherein determining the performance scores of the participating players includes monitoring the activities associated with the one or more performance criteria during the one or more contests by the players that participated in the one or more contests, and
      wherein the activities associated with the one or more performance criteria that contribute to the determination of the performance scores of the participating players in the one or more contests are the same activities performed by the players to achieve one or more game objectives of the ongoing gameplay outside of the one or more contests, wherein the activities include one or more of resource collection, building possession, rescues, or level progress such that the an individual player's resource collection, building possession, recues, or level progress while the individual player is participating in the one or more contests also impacts the individual player's achievement of the one or more game objectives of the ongoing gameplay within the online game; and
   distributing automatically the awards to individual ones of the participating players in accordance with the performance scores of the individual participating players.

12. The method of claim 11, wherein the interaction of the players with the online game and/or each other includes performing operations in the online game to achieve the one or more game objectives.

13. The method of claim 11, wherein the performance criteria relate to success with respect to the one or more contests.

14. The method of claim 11, wherein the administrator user interface further receives user input that indicates one or more qualifications for individual players to participate in the one or more contests, wherein the one or more qualifications include merit-based qualifications associated with the online game earned separately from the one or more contests and prior to a contest period that defines one or more durations of availability of the one or more contests, wherein the one or more durations correspond to the one or more contests, and wherein providing the notification is performed such that the notification is limited to the players that meet the one or more qualifications.

15. The method of claim 14, wherein the merit-based qualifications relate to one or more of possessed buildings, collected resources, combat history, rescue history, or levels associated with the online game.

16. The method of claim 14, wherein the notification indicates one or more of the users that are qualified to participate in the one or more contests based on the one or more qualifications.

17. The method of claim 11, further comprising:
automatically and repeatedly initiating additional contests by providing notifications to the players, determining the performance scores, and distributing the awards, wherein initiation of the additional contests is in accordance with one or both of a predetermined schedule and a trigger as indicated by the user input received from the administrator.

18. The method of claim 11, further comprising facilitating automated distribution of at least one of the awards to at least one of the participating players in response to the performance scores of the at least one of the participating players satisfying one or more performance thresholds.

19. The method of claim 11, wherein the user inputs received from the administrator further indicate one or more predetermined intervals of the one or more contests, the method further comprising facilitating, based on the one or more predetermined intervals of the one or more contests, the automated distribution of the awards to the individual participating players.

20. The method of claim 19, further comprising:
facilitating automated distribution of a first award of the awards during a first predetermined interval of the predetermined intervals to a first participating player of the participating players in response to the performance scores of the first participating player satisfying a first performance threshold during the first predetermined interval; and
facilitating automated distribution of a second award of the awards during a second predetermined interval of the predetermined intervals to the first participating player in response to the performance scores of the first participating player satisfying a second performance threshold during the second predetermined interval.

* * * * *